United States Patent
Naito et al.

(10) Patent No.: US 6,450,020 B1
(45) Date of Patent: Sep. 17, 2002

(54) TIRE AIR PRESSURE WARNING DEVICE

(75) Inventors: Toshiharu Naito, Okazaki; Mamoru Sawada, Yokkaichi; Takeyasu Taguchi, Nagoya; Yuichi Inoue, Tajimi, all of (JP)

(73) Assignee: Denso Corporation, Kariya (JP)

( * ) Notice: Subject to any disclaimer, the term of this patent is extended or adjusted under 35 U.S.C. 154(b) by 22 days.

(21) Appl. No.: 09/649,817

(22) Filed: Aug. 28, 2000

(30) Foreign Application Priority Data

Aug. 30, 1999 (JP) .......................................... 11-243389

(51) Int. Cl.$^7$ ............................................. B60C 23/02
(52) U.S. Cl. ..................................................... 73/146.2
(58) Field of Search .............................. 73/146.2, 146.4, 73/146.5, 146.8, 146.3; 340/442, 444, 445, 443

(56) References Cited

U.S. PATENT DOCUMENTS

| 5,497,657 A | | 3/1996 | Taguchi et al. |
| 5,553,491 A | | 9/1996 | Naito et al. |
| 5,557,552 A | * | 9/1996 | Naito et al. .................. 340/444 |
| 5,753,809 A | * | 5/1998 | Ogusu et al. .............. 73/146.2 |
| 5,801,305 A | * | 9/1998 | Kawai et al. .............. 73/146.2 |
| 5,878,365 A | * | 3/1999 | Onogi et al. ................... 701/70 |

* cited by examiner

Primary Examiner—Max Noori
(74) Attorney, Agent, or Firm—Law Offices of David G. Posz

(57) ABSTRACT

In a tire air pressure warning device, an outside impact such as hydraulic brake pressure is intentionally applied in a pulsating way to a tire when the vehicle substantially stops so as to exert vibration (rotation variation) of the tire axle. Through data processes in analyzing signals of wheel speed sensors that reflect the rotation variation of the tire axle, tire air pressure is estimated for informing to a driver abnormal tire air pressure.

11 Claims, 10 Drawing Sheets

TIRE AIR PRESSURE WARNING DEVICE

CROSS REFERENCE TO RELATED APPLICATION

This application is based upon and claims the benefit of priority of Japanese Patent Application No. H. 11-243389 filed on Aug. 30, 1999, the content of which is incorporated herein by reference.

BACKGROUND OF THE INVENTION

1. Field of the Invention

The present invention relates to a tire air pressure warning device for indirectly detecting tire air pressure of a vehicle or a change of the same and warning a reduction of the tire air pressure without using pressure sensors provided for this purpose.

2. Description of the Prior Art

There has been proposed a tire air pressure detecting device in which the tire air pressure is indirectly detected as a substituting characteristic for the tire pressure, based on signals generated by wheel speed sensors. For example, there is known a tire air pressure warning system in which, in view of a fact that a resonance frequency (spring constant) of the tire may be changed according to variation of the tire air pressure, a resonance frequency (spring constant) fk estimated by data processing based on wheel speed signals is compared with a predetermined threshold value fo for determining tire air pressure, as disclosed in JP-A-5-133831.

In consideration of various forms that the tire air pressure for vehicle becomes abnormal, there is a case that the tire air pressure is slowly reduced by natural leakage and a case that the tire air pressure is reduced when the tire is punctured by a nail. In these two cases of abnormal tire air pressure, it is not always preferable to detect such abnormal tire air pressure during the vehicle running.

For example, in the case of natural leakage of the tire air pressure, it is not necessary to detect the tire air pressure during the vehicle running since the tire pressure is reduced gradually over several months, but it is preferable to detect the abnormal tire air pressure before starting the vehicle.

Further, in a radial type tire for a modern passenger car, the tire pressure is unlikely to be reduced instantaneously even if the tire is punctured. Therefore, it is more important to warn a driver without fail when the tire pressure becomes remarkably low after the vehicle, which has the flat tire, has been parked overnight than to warn the driver within the vehicle while driving when the tire is damaged.

SUMMARY OF THE INVENTION

It is thus an object of the present invention to provide a tire air pressure warning device capable of warning reduction of the tire air pressure by data processing in analyzing the wheel speed signals when the vehicle substantially stops.

To achieve the above object, the tire air pressure warning device comprises detecting means for detecting vibration of the tire axle caused by a pulsating force given to the tire from outside impact means within a period covering from a time when the vehicle stops to a time when the vehicle moves at a predetermined low speed, calculating means for calculating natural frequency or resonance frequency of the detected vibration, determining means for comparing the natural frequency or the resonance frequency with a preset value and determining a state of tire air pressure of the tire, and warning means for informing a driver the state of the tire air pressure. With the device mentioned above, the outside impact means generates a force causing a rotation variation of the tire axle. As the vibration based on the rotation variation of the tire axle reflects a change of the tire air pressure, the tire air pressure may be indirectly detected even when the vehicle substantially stops.

Further, it is preferred that the force causing the rotation variation of the tire axle is generated by intentionally changing a braking force to be applied to the tire axle in a pulsating way at a time when actual brake control for the vehicle such as anti-skid control and other brake control is not executed, for example, when the vehicle substantially stops.

Furthermore, it is preferable from a cost standpoint to execute data processes of signals for determining abnormal tire air pressure and to control the hydraulic brake circuit in use of ECU for the anti-skid control. In this case, a surplus burden can not be given to ECU for the anti-skid control since the tire air pressure warning device is operative only when the vehicle substantially stops and the anti-skid control is not executed.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

A tire air pressure warning device according to first embodiment of the present invention is described with referring to drawings.

The warning device has a tire pressure estimating device in which a natural frequency or a resonance frequency such as a torsional vibration of the tire is detected from wheel speed signals generated by the respective wheel sensors and whether or not tire air pressure is below a lower limit is determined based on the detected natural frequency or resonance frequency.

As a relationship between the tire air pressure and the tire natural frequency, there exists a relation that, as the tire air pressure is lower, the tire natural frequency is lower. Further, the torsinal vibration in a rotating direction, of the tire is reflected on the wheel speed signals and may be detected as a detected natural frequency based on the wheel speed signals. Accordingly, between the tire air pressure and the detected natural frequency, there also exists a relation that, as the tire air pressure is lower, the detected natural frequency is lower.

Figure 3:
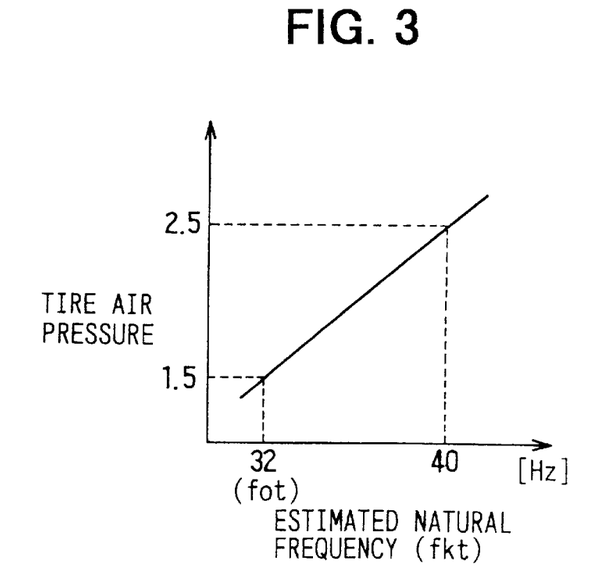
FIG. 3 is a characteristic graph showing the relationship between an estimated value of natural frequency and a tire air pressure flowchart representing a process of estimating a change in tire air pressure.

According to the device of the present invention, in view of a typical relationship between the tire air pressure and the natural frequency to be estimated from the wheel speed signals as shown in FIG. 3, the tire air pressure is estimated and it is determined whether the estimated tire air pressure is below a lower limit for adversely affecting on the vehicle driving.

Figure 1:
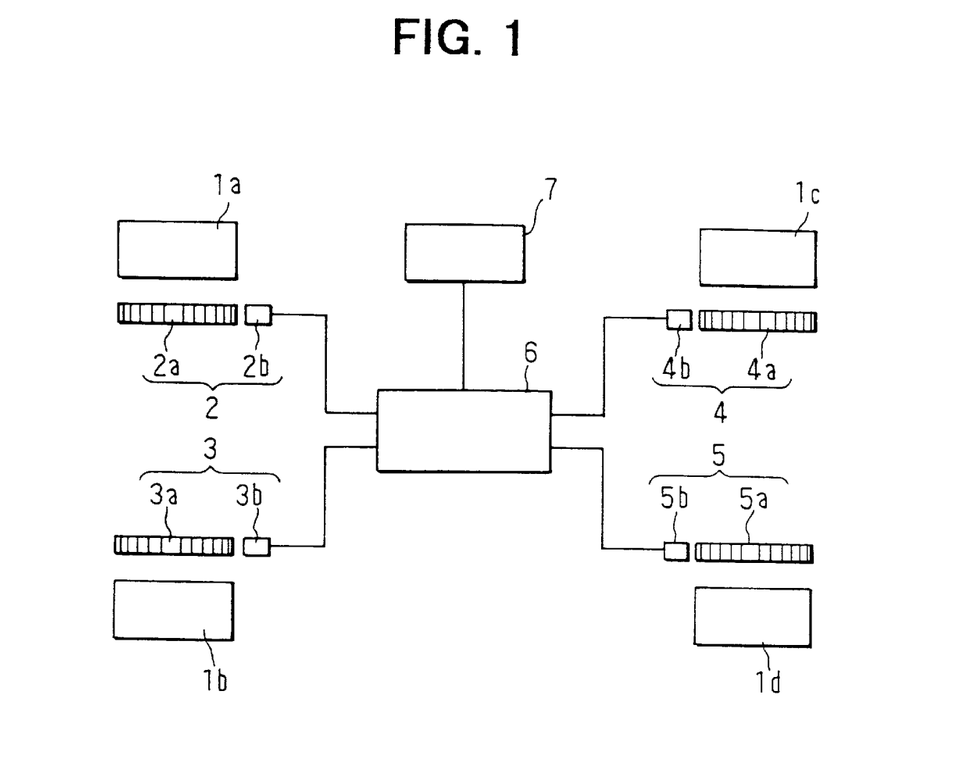
FIG. 1 is a model diagram showing a construction of tire air pressure warning device according to a first embodiment.

As shown in FIG. 1, which illustrates a whole construction of the tire air pressure warning device according to the present invention, wheel speed sensors 2 to 5 are provided so as to correspond to respective tires 1a to 1d of a vehicle. The respective wheel speed sensors 2 to 5 are composed of rotors 2a to 5a and pickup coils 2b to 5b. Each of the rotors 2a to 5a is positioned on an axis common to that of each of the tires 1a to 1d (not shown) and is shaped as a disk made of magnetic material.

When a vibration due to an outside impact is applied to each of the tires 1a to 1d, each of the tires causes a torsional vibration in a rotating direction or in a circumferential direction. Accordingly, a small vibration generates around the each axis of the rotors 2a to 5a integrated with each axle of wheels of the tires 1a to 1d.

Figure 4:
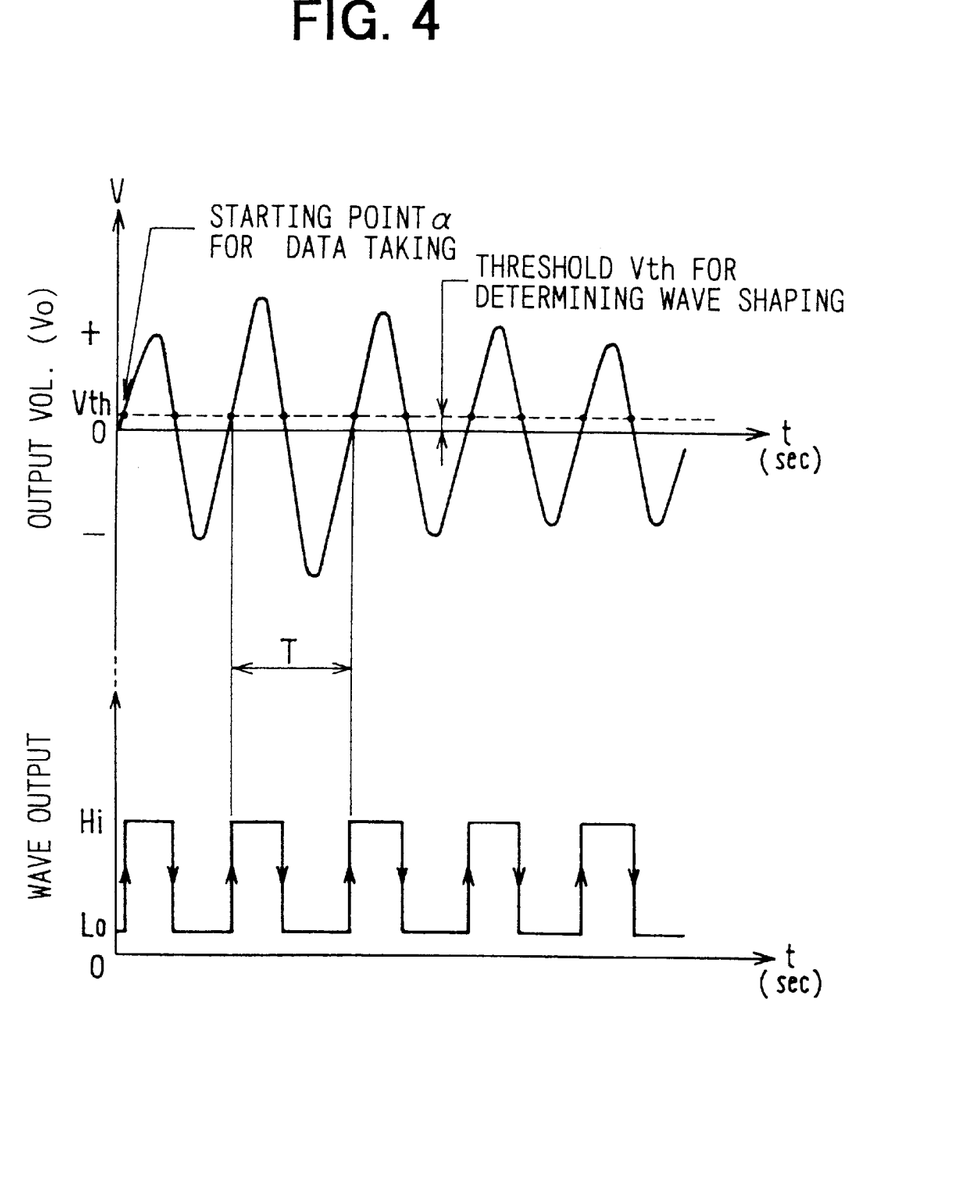
FIG. 4 is a view showing a voltage waveform generated by a wheel speed sensor based on an outside impact given to a tire and, in relation thereto, a view showing a voltage waveform through a waveform shaping circuit.

Therefore, as a relative distance between each of the pickup coils 2b to 5b and each of the rotors 2a to 5a is changed, each of the pickup coils 2b to 5b generates, as shown in FIG. 4, an alternating current signal whose cycle corresponds to a period of the tire torsional vibration.

The alternating current signals output from the pickup coils 2b to 5b are transferred to a well known electric control unit (hereinafter referred as ECU) having a micro computer composed of CPU, ROM and RAM and waveform shaping circuits. A predetermined data processing including waveform shaping processes of the alternating current signals output from the pickup coils 2b to 5b is executed in the ECU.

A value fkt of the natural frequency estimated through the data processing is compared with a preset threshold value fot for determining air pressure and, when the value fkt is below the value fot (for example, 32 Hz), the tire air pressure is determined to be abnormal. Then a warning is generated. Results of the data processing are output to a display portion for informing a driver each tire pressure state of the tires 1a to 1d. The display portion may be a display device independently informing the driver of the respective tire pressures of the tires 1a to 1d or a warning lamp for alarming the driver when the tire air pressure is below the predetermined value in at least one of the tires 1a to 1d.

Figure 2:
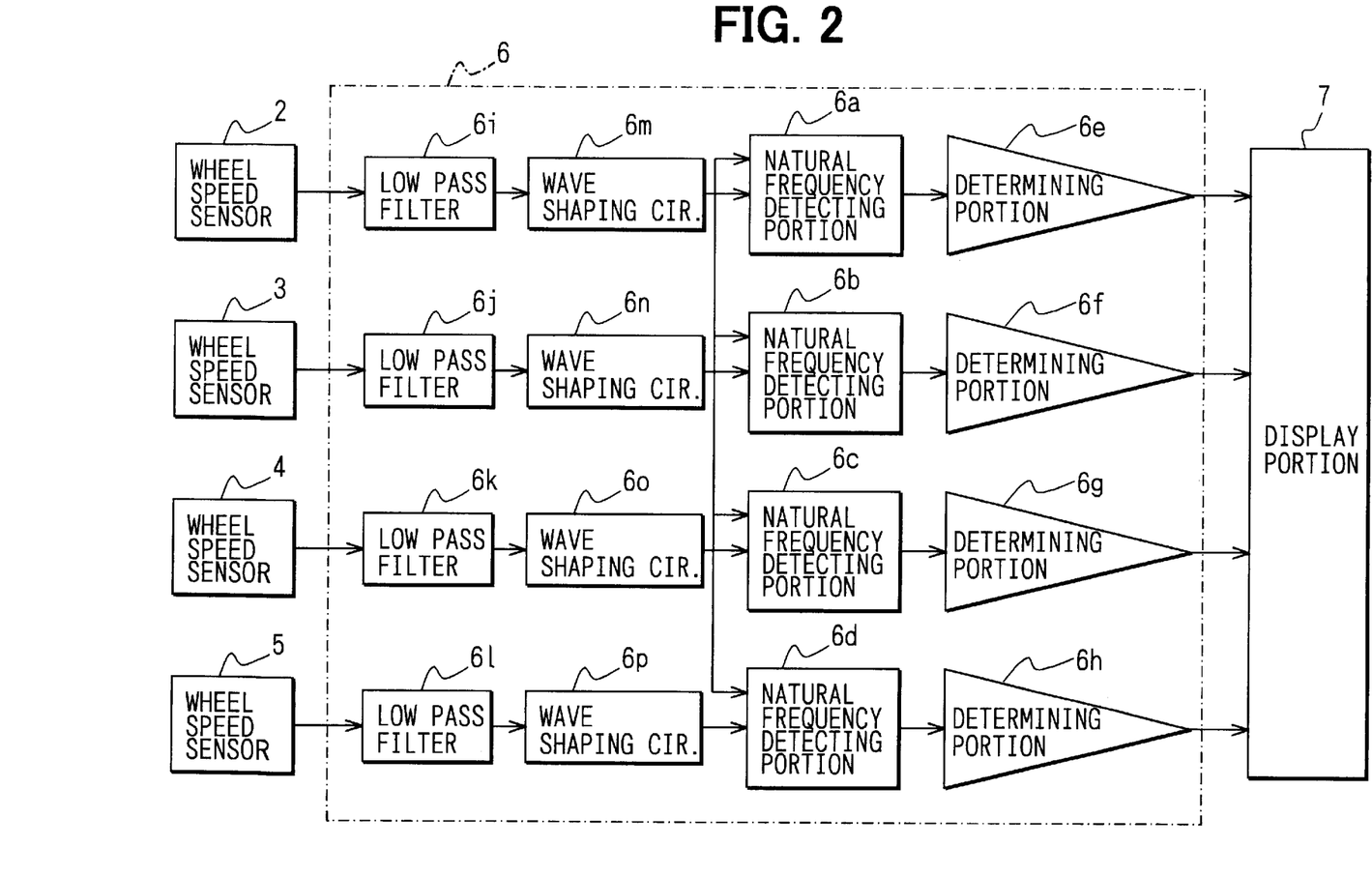
FIG. 2 is a block diagram showing a function of ECU according to the first embodiment.

Next, an operation of ECU 6 is described with reference to FIG. 2. ECU 6 determines whether the tire air pressure of each of tires 1a to 1d is abnormal based on output of the wheel speed sensors 2 to 5. ECU also outputs drive signals for warning or alarming to the display portion 7.

ECU 6 is provided with low pass filters 6i to 6l for eliminating noises from signals of the wheel speed sensors 2 to 5 and screening vibration components necessary for estimating the tire air pressure, waveform shaping circuit 6m to 6p for measuring a period T necessary for calculating the natural frequency based on the signals of the wheel speed sensors, natural frequency detecting portions 6a to 6d, and determining portions 6e to 6h for determining the abnormal tire air pressure based on the calculated natural frequency. Instead of the low pass filters 6i to 6l, the waveform shaping circuit 6m to 6p, the natural frequency detecting portions 6a to 6d, and the determining portions 6e to 6h, which correspond to the wheel speed sensors 2 to 5, respectively, ECU 6 may have respective one or two of the low pass filters, the waveform shaping circuit, the natural frequency detecting portions, and the determining portions and may process sequentially in time one by one or two at the same time with respect to the output signals generated by the wheel speed sensors.

FIG. 4 shows an example of voltage waveform generated by the wheel speed sensors due to the outside impact (a force causing rotation variation) given to the tires. The waveform represents an attenuating vibration caused by the outside impact. FIG. 4 also shows an example of a wave output as a result of the waveform shaping through the waveform shaping circuits 6m to 6p provided in ECU 6. A voltage Vth, shown in FIG. 4, represents a threshold voltage for the waveform shaping, which may be changed according to vehicle models or capacity variations of the wheel speed sensors. As the voltage waveform generated by each of the wheel speed sensors is largely affected by the relative distance between the rotors 2a to 5a and the pickup coils 2b to 5b, the voltage Vth may be adjusted according to a size, large and small, of the voltage waveform generated.

A starting points for taking data in ECU is a point where the output voltage of the pickup coil crosses at first the threshold voltage for determining the waveform shaping. A period T shows a time from a point where an output voltage after the waveform shaping rises up to a point where the next output voltage after the waveform shaping rises up.

Figure 5:
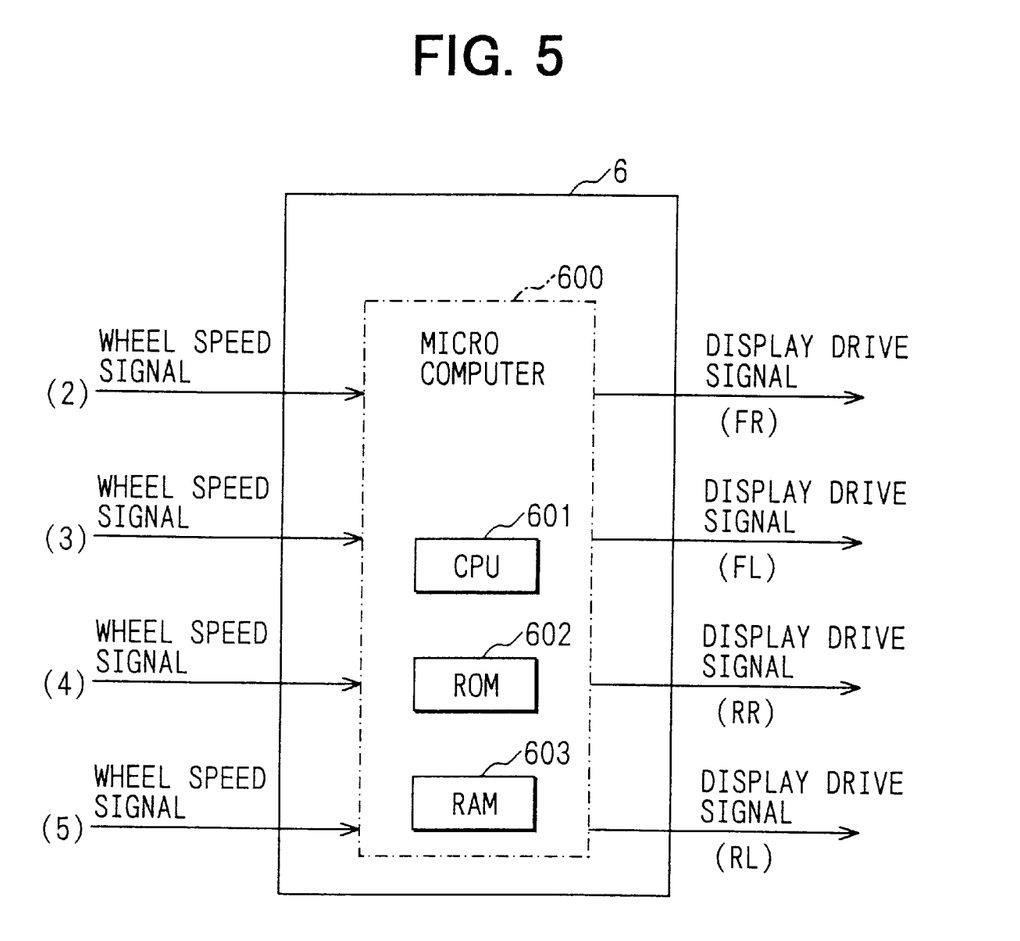
FIG. 5 is a view showing a construction of ECU according to the first embodiment.

As shown in FIG. 5, ECU 6 has a microcomputer 600 that may execute an ordinary processing function. The microcomputer 600 operates to achieve functions of the natural frequency detecting portions 6a to 6d and the determining portions 6e to 6h, as mentioned above. It is well known that the microcomputer 600 is composed of a CPU 601 as a processing unit, a ROM 602 to be used as a program memory and a RAM 603 to be used as a data memory. As mentioned above, the value of the tire natural frequency may be calculated based on the signals of the wheel speed sensors to be generated by the outside impact given to the tires.

Figure 6:
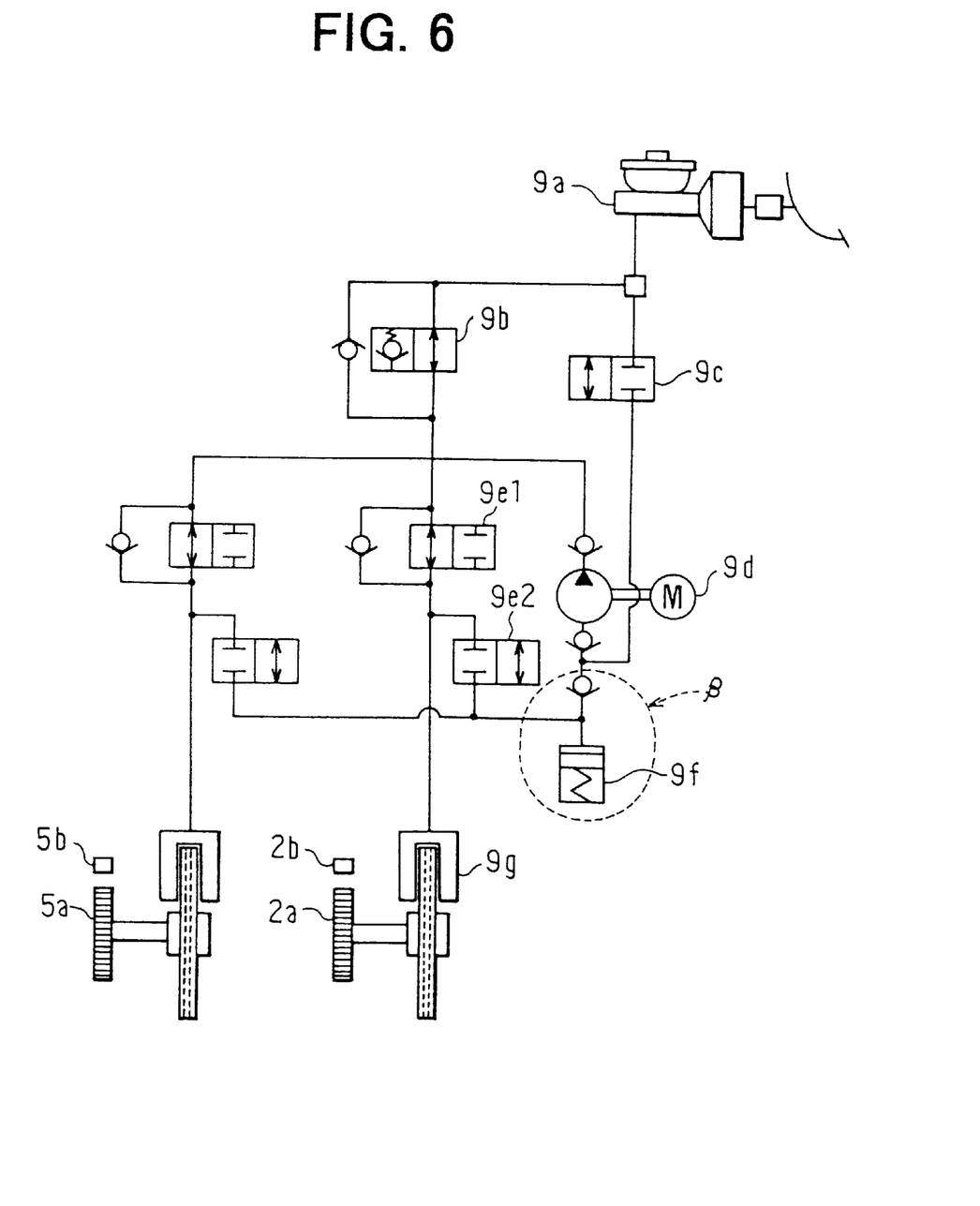
FIG. 6 is a diagram showing a brake hydraulic circuit as means for giving an outside impact to the tire.

Next, a typical example of means for giving the outside impact to the tires is described with reference to FIG. 6. FIG. 6 shows a construction of a brake system as the means for giving the outside impact (force causing the rotation variations) to the tires.

FIG. 6 shows the brake system (for two wheels). The brake system for one of the wheels is composed of a master cylinder 9a, an adjusting valve 9b, a cut valve 9c, a hydraulic pump & motor 9d, pressure control valves 9e1 and 9e2, a reservoir 9f, a wheel cylinder 9g and the rotor 2a integrated with a brake rotor. At a normal braking state where special control such as ABS control is not executed, the respective valves are at positions as shown in FIG. 6. The adjusting valve 9b is shut off for holding hydraulic pressure on a side of the wheel cylinder when the hydraulic pressure of the wheel cylinder becomes higher than that of the master cylinder in traction control, turning direction control or brake assist control to be made at panic braking or at vacuum booster breakage. The cut valve 9c is turned on for allowing to supply brake fluid from the master cylinder 9a to an intake port of the pump in traction control, turning direction control or brake assist control to be made at panic braking or at vacuum booster breakage. The pressure control valve 9e1 is communicated when pressure of the wheel cylinder is increased and is interrupted when the pressure of the wheel cylinder is deduced or maintained in ABS control, traction control or turning direction control. The pressure control valve 9e2 is interrupted when the pressure of the wheel cylinder is increased or maintained and is communicated when the pressure of the wheel cylinder is reduced.

The pressure control valves 9e1 and 9e2 are provided for the wheel of the tire 1d, too. This brake system is normally called a diagonal conduit system. A construction of the brake system for the wheels of the tires 1b and 1c is same as the construction on a side of wheel cylinder with respect to the master cylinder 9a as shown in FIG. 6.

Next, an operation of a hydraulic system for giving the impact (by changing hydraulic pressure) to the wheel cylinder 9g is described.

A state of timing when the hydraulic pressure is changed for giving to the tires the force for causing the rotation variation is preferably either a state that the vehicle stops after an ignition is turned on or a state that the vehicle moves under a predetermined low speed Vso1 after the ignition is turned on.

When ECU determines the state mentioned above, the adjusting valve 9b is turned off, the pressure control valve 9e1 is also turned off, and the pump & motor 9d is driven. As a result, a conduit between the adjusting valve 9b and the pressure control valve 9e1 is pressurized by the discharge of the pump. Then, the pressure control valve 9e1 is pulsatingly turned on and off a plurality of times by a duty control and the like, so that the hydraulic pressure in the wheel cylinder 9g may be varied as shown in A of FIG. 7. Further, after the pressure control valve 9e1 is initially turned on and off and before the pressure control valve 9e1 is subsequently turned on and off, the pressure control valve 9e2 for pressure reduction may be turned on to reduce the pressure in the wheel cylinder as shown in B of FIG. 7. As mention above, the time during which the hydraulic pressure is applied may be a moment like a pulse or a predetermined short time (for example, pressure is applied 4 times in 2 seconds). Accordingly, the rotor 2a induces a minute vibration in a rotational direction.

Figure 7:
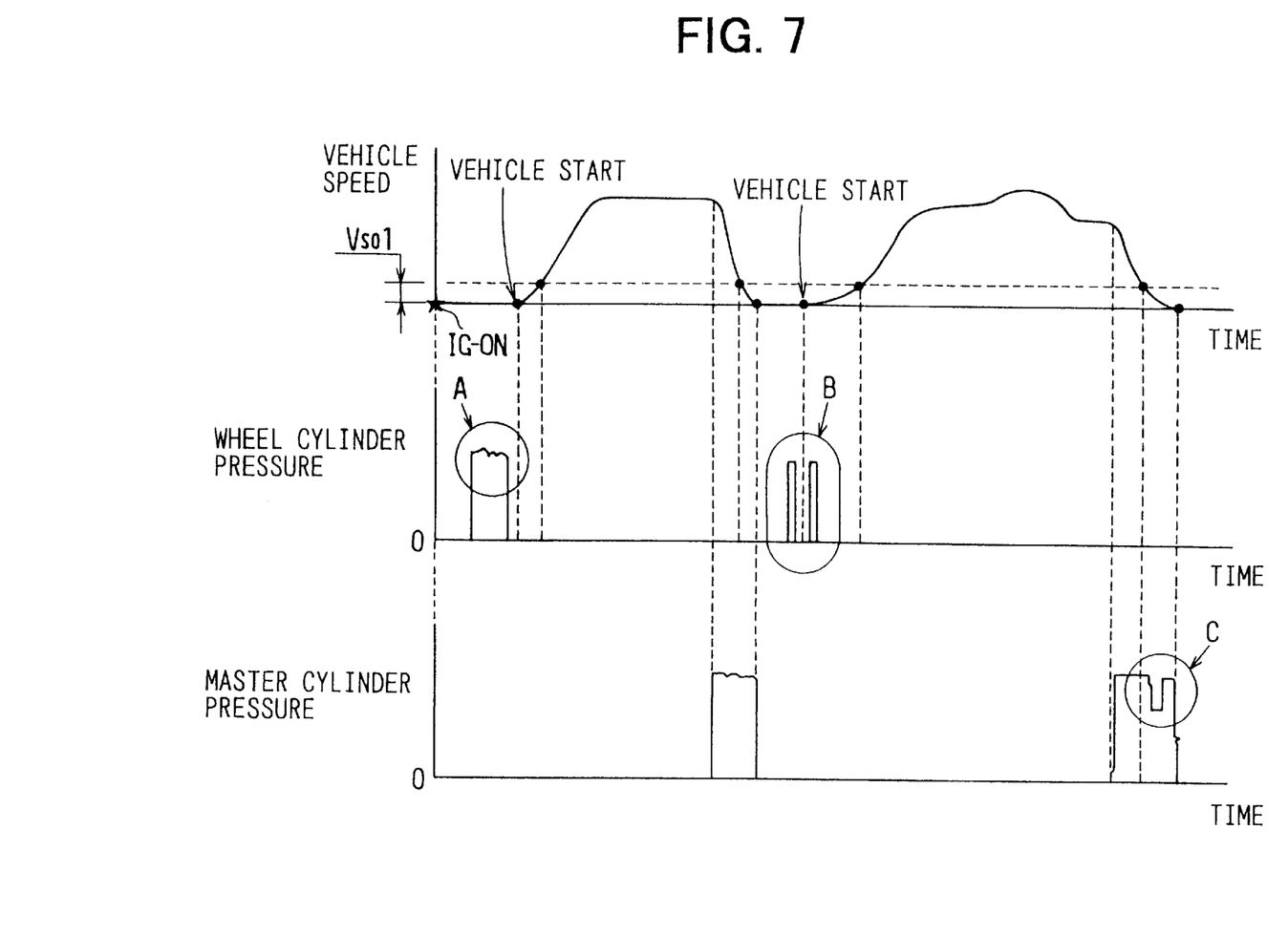
FIG. 7 is a timing chart showing a running state of a vehicle, and, in relation thereto, respective views of wave forms of a wheel cylinder pressure and a master cylinder pressure when the outside impact is given to the tire by the brake hydraulic circuit.

Further, the timing when the hydraulic pressure is applied for causing pressure variation is not limited to be within a period from the time when the ignition is turned on to the time when the vehicle starts, but may fall within a period during which the vehicle stops at a traffic signal or a period during which the vehicle speed is reduced from a predetermined vehicle speed Vso1 until the vehicle completely stops, as shown in B or C of FIG. 7.

Furthermore, a source for applying hydraulic pressure to the wheel cylinder 9g is not limited to the pump & motor 9d but may be the master cylinder 9a. In this case, pressure generated by the master cylinder 9a, which is applied to the wheel cylinder 9g, may be controlled by the pressure control valve 9e2 when the vehicle speed is below the predetermined vehicle speed Vso1 at a normal braking so that the force for causing the rotation variation may be applied to the rotors 2a to 5a as shown in c of FIG. 7. The pressure variation in the master cylinder or in the wheel cylinder may be realized in a manner that the pressure control valve 9e2 is controlled to change from a communicating state to a interrupting state for a predetermined period.

Moreover, instead of the pump & motor, an accumulator (not shown in FIG. 7) may be used as a hydraulic source to the master cylinder 9g.

Figure 8:
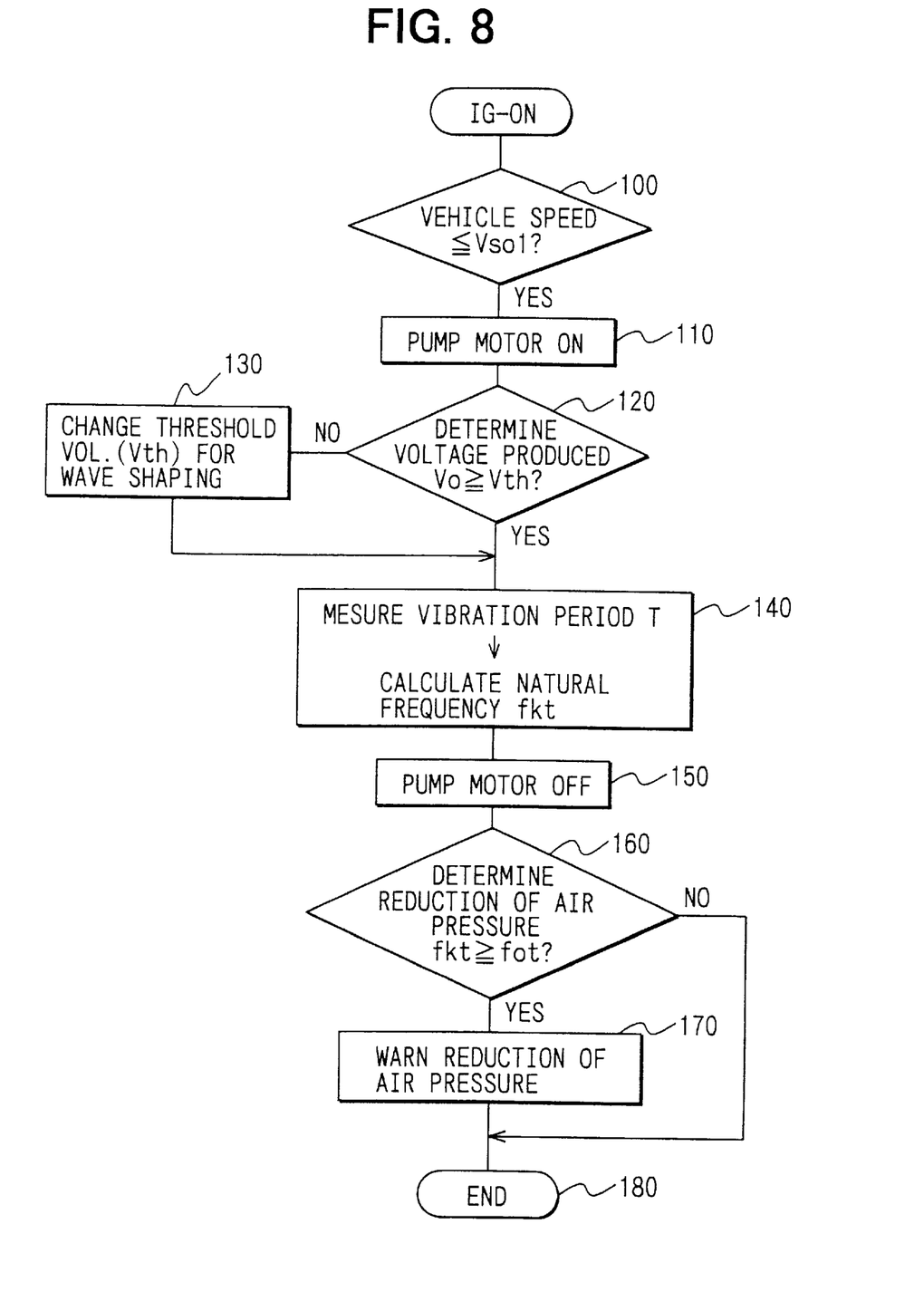
FIG. 8 is a flowchart showing processes in ECU according to the first embodiment.

Next, a flowchart showing a process in ECU 6 for the tire air pressure estimating device is described in FIG. 8. As ECU 6 executes identical processes with respect to the respective tires 1a to 1d, the flowchart described below shows a process only relative to the tire 1a.

When the ignition switch is turned on, the process goes to STEP 100 where a determination of the vehicle speed (whether the vehicle substantially stops) is executed. If determined at STEP 100 that the vehicle substantially stops ($\leq$Vso1), the process goes to STEP 110. Then, the pump & motor 9d, the adjusting valve 9b, the cut valve 9c and the pressure control valves 9e1 and 9e2 in the brake system are operated. The Vso1 may be 4 km/s, which means the vehicle speed is substantially zero, in consideration of a signal breakdown capacity of the wheel speed sensors 2 to 5.

Next, at STEP 120, the voltage Vo generated by the pickup coil 2b is compared with the threshold voltage Vth for waveform shaping and, if the voltage Vo is sufficiently larger than the threshold voltage Vth, the process goes to STEP 140 where the vibration period T is measured from the wave form after the waveform shaping (rectangular wave). As a result of the measurement, the value fkt of the natural frequency for rotating vibration in a torsional direction of the tire is calculated. When the vehicle stops or moves at a very low speed, the vibration input to be transferred from the road surface to the tire is almost nothing and only the vibration input that is generated by the hydraulic pressure change and transmitted through the wheel axle substantially affects detecting the tire air pressure. As the vibration input by the hydraulic pressure to be transmitted to the tire occurs only for a moment or a very short period in a pulsating way and never occurs continuously, no resonance vibration between the natural frequency depending on the tire air pressure and the vibration input from the outside substantially occurs. Therefore, an attempt of obtaining a resonance frequency depending on the tire air pressure based on the wheel speed signals by FFT calculation and the like will result in obtaining a frequency of the natural vibration that is an attenuating vibration.

Thus, in either case, for obtaining the resonance vibration frequency or the natural frequency, the calculation will achieve the object for the present invention.

Further, if the vibration input to the tire due to the brake hydraulic pressure variation occurs continuously for a predetermined time, resonance vibration phenomena caused by the vibration input may take place. In this case, a frequency depending on the tire air pressure may be obtained as the resonance vibration frequency, not the natural vibration frequency as mentioned above.

If STEP 120 determines that the voltage Vo generated is lower than the threshold voltage Vth, the threshold voltage Vth is changed to a lower value in order to calculate the value fkt of the natural frequency at STEP 130.

After calculating the value fkt of the natural frequency, STEP 150 processes to stop the operation of the pump & motor 9d. At STEP 160, the calculated value fkt of the natural frequency is compared with the preset value fot for determining the reduction of the tire air pressure and, if determined that the tire air pressure is abnormal, a signal for warning the reduction of the air pressure is output for alarming to the driver at STEP 170.

Next, a second embodiment of the present invention is described with reference to FIG. 9.

According to the second embodiment, a basic construction of the tire air pressure warning device is same as that disclosed in FIG. 1. An inner construction of ECU 6 and means for applying the outside impact (force for causing rotation variation) to the tires are different from those of the first embodiment.

A controller (hereinafter referred as ECU 10) whose inner construction is different from that of ECU 6 is described with reference to FIG. 9.

Figure 9:
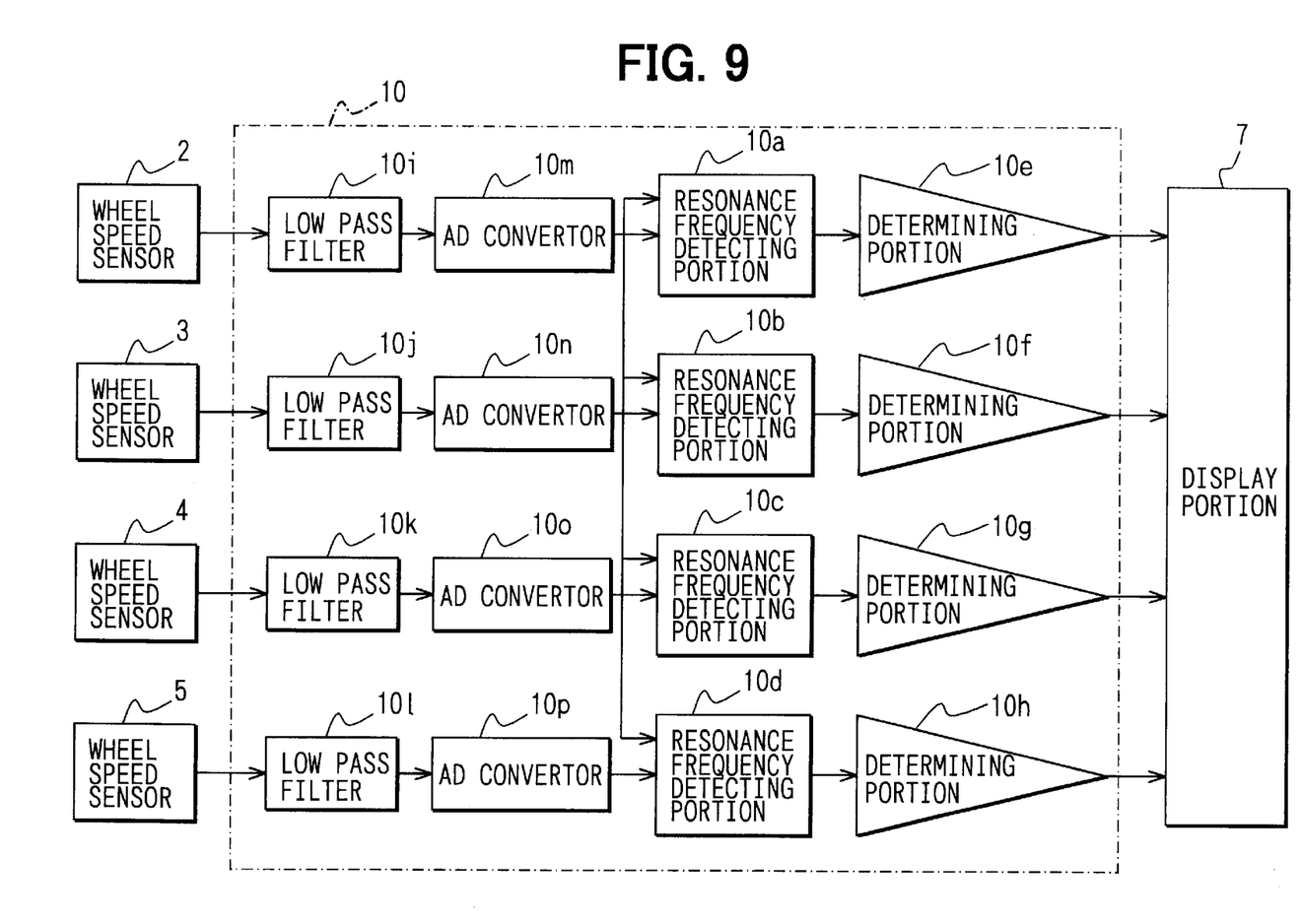
FIG. 9 is a block diagram showing functions of ECU according to a second embodiment.

As shown in FIG. 9, ECU 10 has a portion for determining whether each tire air pressure of the respective tires is abnormal based on each of the wheel speed sensors and a portion for generating a drive signal for displaying to the display portion 7, which are same as those of ECU 6.

ECU 10 is provided inside thereof with low pass filters 10i to 10l for screening vibration components necessary for estimating the tire air pressure from signals of the wheel speed sensors 2 to 5, AD converters 10m to 10p for converting analog signals of the wheel speed sensors into digital signals, resonance frequency detecting portions 10a to 10d for calculating a resonance frequency in a torsional direction of the tire through a frequency calculation processes based on the digital signals and determining portions 10e to 10h for determining the abnormal tire air pressure based on the calculated resonance frequency. Instead of the construction mentioned above, ECU 10 may have respective one or two of the low pass filters, the AD converters, the resonance frequency detecting portions, and the determining portions and may process sequentially in time one by one or two at the same time with respect to the output signals generated by the wheel speed sensors, which are similar to those of the first embodiment.

Figure 10A:
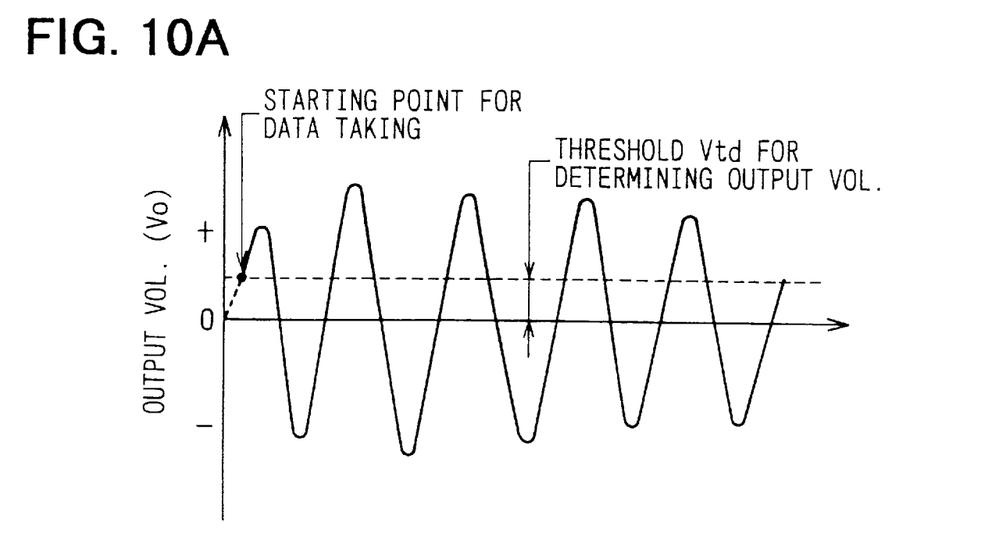
FIG. 10A is a view showing a voltage waveform generated by a wheel speed sensor based on an outside impact given to a tire.

FIG. 10A shows an example of voltage wave generated by the wheel speed sensors due to the outside impact (a force causing rotation variation) given to the tires. A voltage Vtd, shown in FIG. 10A, represents a threshold voltage for determining whether the analog signal has an output voltage sufficient enough to obtain the resonance frequency through the subsequent frequency calculation processes. In the second embodiment, a control for applying the outside impact is conducted in a manner that the hydraulic pressure variation is executed in a pulsating way continuously for a plurality of times during a predetermined period. As a result, the resonance vibration, which is sufficiently detectable, may be obtained from the natural frequency depending on the tire air pressure and the outside input of the hydraulic pressure variation.

Figure 10B:
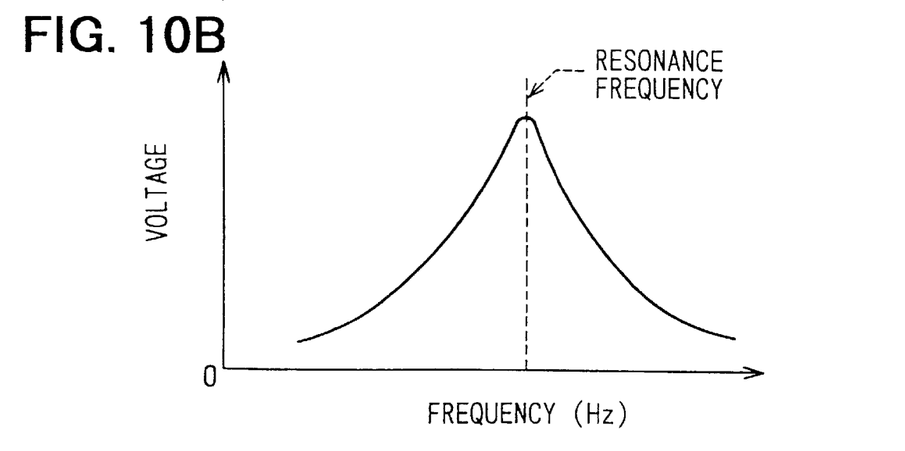
FIG. 10B is a view showing a voltage waveform through an AD converter.

FIG. 10B shows an example of the calculated resonance frequency by processing the digital signals of the AD converters in ECU 100 through one of the resonance frequency detecting portions 10a to 10d.

A starting point for data taking is a point where the output voltage of the pickup coil crosses at first the threshold voltage for determining the output voltage.

ECU 100 has a microcomputer 600 similar to that shown in FIG. 5 and operates to achieve functions of the resonance frequency detecting portions 10a to 10d and the determining portions 10e to 10h, as mentioned above. It is well known that the microcomputer 600 is composed of a CPU 601 as a processing unit, a ROM 602 to be used as a program memory and a RAM 603 to be used as a data memory.

Next, in cases that, as examples of the means for giving the outside impact to the tires, an engine shaking caused by turning on the ignition switch, a shock caused by changing gears at starting the vehicle and a driving force change around the tire axles caused by releasing or operating a parking brake are used, processes for control thereof are described with reference to FIG. 11.

Figure 11:
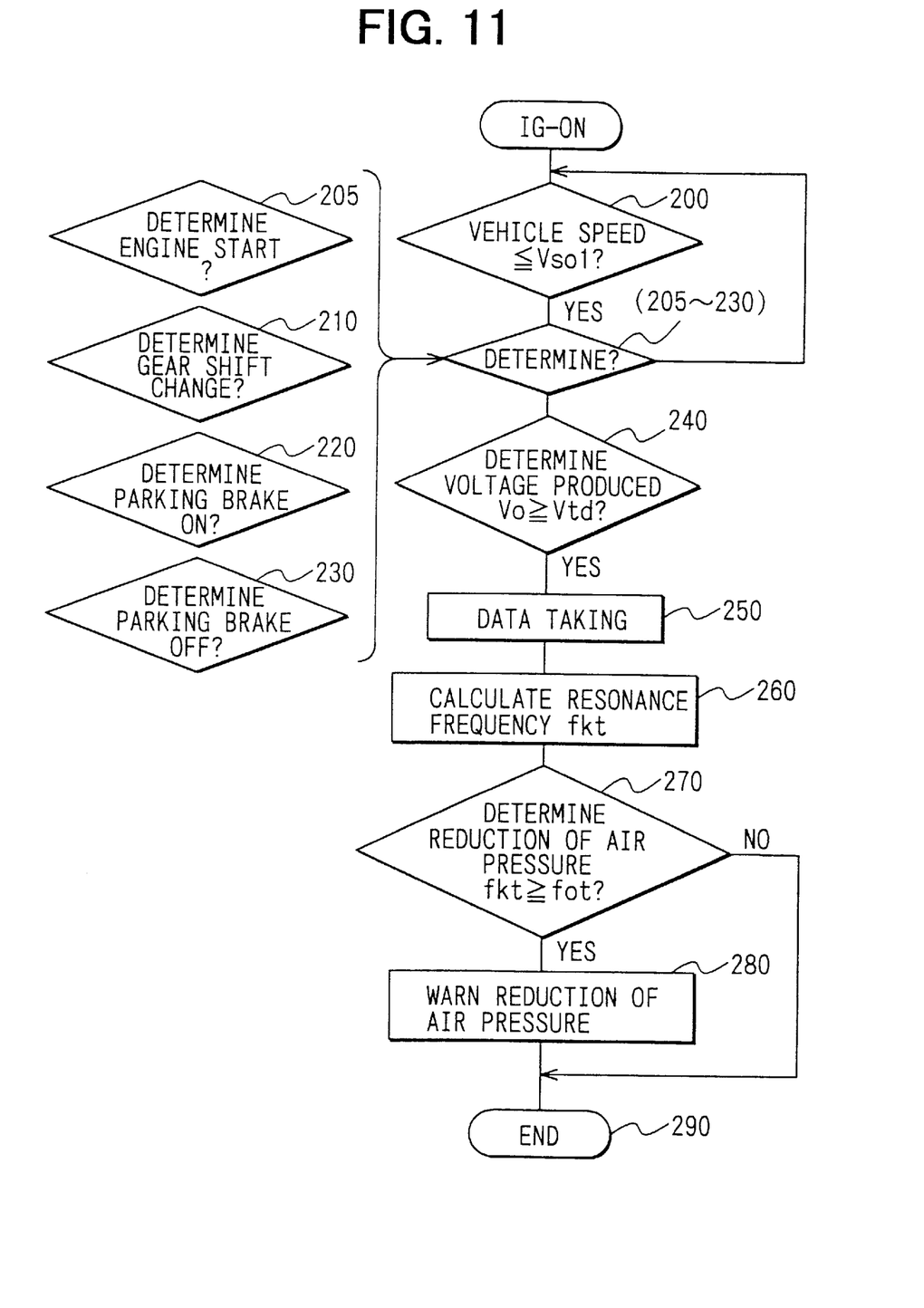
FIG. 11 is a flowchart showing processes in ECU according to the second embodiment.

FIG. 11 is a flowchart showing a process in ECU 10 for the tire air pressure estimating device according to the second embodiment. As ECU 10 executes identical processes with respect to the respective tires 1a to 1d, the flowchart described below shows a process only relative to the tire 1a.

When the ignition switch is turned on, the process goes to STEP 200 where a determination of the vehicle speed (whether the vehicle substantially stops) is executed. If determined at STEP 200 that the vehicle substantially stops ($\leq$Vso1), the process. goes to STEP 110. STEP 205 determines an engine start in such a manner that engine revolution is larger than a predetermined value and/or a starter is returned from an on state to an off state. STEP 210 determines a gearshift change. In a case of automatic shift vehicles, whether a shift lever is moved from a parking range to a drive range. STEP 220 determines that a parking brake is turned from an off state to an on state and STEP 230 determines that the parking brake is turned from the on state to the off state.

STEPs 205 to 230 determine respective existences of various inputs for triggering impacts that cause vibrations of the rotors 2a to 5a integrated with the tires. If the determination of one or more of STEPs 205 to 230 is positive, the process goes to STEP 240. If the determination is negative, that is, if no existence of the input causing the vibration of the rotors 2a to 5a is determined, the process returns to STEP 200.

STEP 240 determines a magnitude of the voltage Vo generated by the pickup coils 2b to 5b to make sure whether the signal is sufficient enough to calculate the accurate resonance frequency at STEP 260.

After STEP 240 determines that the signal has the voltage sufficiently large for the subsequent process, a certain number of digital signals are taken in ECU 10 at STEP 250 as a starting point for data taking that is a point where the output voltage Vo of the pickup coil crosses at first the threshold voltage Vtd.

At STEP 260, the resonance frequency fkt is calculated through a frequency analysis calculation process based on the digital data taken in. The frequency analysis calculation process may use calculation methods such. as FFT (Fast Fourier Transform) calculation (refer to JP-A-5-133831) and Linear Estimation calculation (refer to JP-A-9-104208).

The frequency depending on the tire air pressure may be obtained as the natural frequency, not the resonance vibration frequency, in the second embodiment, too, if the vibration input to the tires occurs only for a moment or a very short period in a pulsating way.

At STEP 270, the calculated value fkt of the resonance vibration is compared with the preset value fot for determining the reduction of the tire air pressure and, if determined that the tire air pressure is abnormal, a signal for warning the reduction of the air pressure is output for alarming to the driver at STEP 280.

It is not always necessary in the second embodiment to have STEPs 205 to 230 in which the existence of the vibration inputs for triggering the impact is determined, since, if STEP 240 determines that the voltage Vo generated has a certain largeness of voltage, the generation of the voltage may be presumed as a result that the rotors has been exerted in torsinal direction by any of the vibration inputs.

The present invention is not limited to the embodiments mentioned above but may be modified to various ways.

What is claimed is:

1. A tire air pressure warning device in a vehicle provided with a tire including a tire axle and outside impact means for giving to the tire an outside impact causing a vibration of the tire axle, comprising:

detecting means for detecting the vibration of the tire axle caused by the outside impact means within a period covering from a time when the vehicle stops to a time when the vehicle moves at a predetermined low speed;

calculating means for calculating at least one of natural frequency and resonance frequency of the detected vibration;

determining means for comparing the at least one of natural frequency and resonance frequency with a preset value and determining a state of tire air pressure of the tire; and warning means for informing to a drive the state of the tire air pressure, wherein the outside impact means generates a force causing a rotation variation of the tire axle.

2. A tire air pressure warning device according to claim 1 wherein the force causing the rotation variation of the tire axle is generated by changing a braking force to be applied to the tire axle.

3. A tire air pressure warning device according to claim 1 wherein the force causing the rotation variation of the tire axle is generated by changing a force for driving the tire axle.

4. A tire air pressure warning device according to claim 1, wherein the detecting means has signal generating means for generating time dependent waveform signals reflecting the vibration of the tire axle when the vehicle stops, and variable threshold means for setting a threshold to the waveform signals so as to generate subsequent output signals whose largeness are sufficient enough for the calculating means to calculate the at least one of natural frequency and resonance frequency of the detected vibration, whereby a value of the threshold may be varied according to largeness of the waveform signals.

5. A tire air pressure warning device according to claim 1, wherein the outside impact means gives to the tire outside impact causing the vibration of the tire axle within a period during which the vehicle stops.

6. A tire air pressure warning device according to claim 1, wherein the outside impact means gives to the tire outside impact causing the vibration of the tire axle within a period from a time when an ignition switch is turned on to a time just before the vehicle starts moving.

7. A tire air pressure warning device according to claim 1, wherein the outside impact means is a hydraulic brake circuit having a wheel cylinder, whereby the outside impact is a hydraulic shock generated in the hydraulic brake circuit and transmitted to the tire via the wheel cylinder.

8. A tire air pressure warning device according to claim 7, wherein the hydraulic brake circuit has at least one of a pump and an accumulator operative for executing at least one of anti-skid control, brake assist control, turning direction control and traction control and the hydraulic shock is generated when pressure in the at least one of a pump and an accumulator is transmitted intentionally in a pulsating way to the wheel cylinder.

9. A tire air pressure warning device according to claim 8, wherein the hydraulic brake circuit has a pressure control valve for controlling the pressure in the wheel cylinder on executing at least one of anti-skid control, brake assist control, turning direction control and traction control, whereby the pressure control valve is intentionally turned on and off for a short period with a repetition adequately selected from single to several times so that the pressure variation in the wheel cylinder may take place in a pulsating way.

10. A tire air pressure warning device according to claim 1, wherein the detecting means has a wheel speed sensor for generating output signals from which the vibration of the tire axle is detected.

11. A tire air pressure estimating device according to claim 9, wherein the resonance frequency is constituted by two elements, one of the elements being a resonance frequency component of about 70 hertz in an up & down direction relative to a vehicle body at a normal air pressure of the tire and the other of the elements being a resonance frequency component of about 95 hertz in a back & forth direction relative to the vehicle body at the normal air pressure of the tire.

* * * * *